United States Patent [19]
Askam

[11] 3,930,530
[45] Jan. 6, 1976

[54] CLAMPING DEVICE

[75] Inventor: John Fairburn Askam, Sutton Coldfield, England

[73] Assignee: Dunlop Limited, London, England

[22] Filed: May 30, 1974

[21] Appl. No.: 474,582

[30] Foreign Application Priority Data
June 13, 1973 United Kingdom............ 28160/73
Dec. 11, 1973 United Kingdom............ 57304/73

[52] U.S. Cl............................. 157/1.24; 144/288 A
[51] Int. Cl.²........................................ B60C 25/06
[58] Field of Search.............. 157/1.2, 1.24, 1.28; 144/288 A

[56] References Cited
UNITED STATES PATENTS
2,882,943  4/1959  Gobby............ 144/288 A
3,074,468  1/1963  Tarazona............ 157/1.24

Primary Examiner—Al Lawrence Smith
Assistant Examiner—Harold P. Smith, Jr.
Attorney, Agent, or Firm—Stevens, Davis, Miller & Mosher

[57] ABSTRACT

A clamping device for a workpiece, in particular a wheel during a tire changing operation, comprising a supporting base, an upright post wich protrudes through the workpiece e.g. the central hole of a wheel and a securing member e.g. a tube or a plate, which may be non-rotatably positioned on the post. A projection on the member engages with the workpiece e.g. a bolt hole of the wheel, whereby on application of a force tending to rotate the workpiece the engagement of the workpiece with projection and member with post prevents rotation of the workpiece.

11 Claims, 10 Drawing Figures

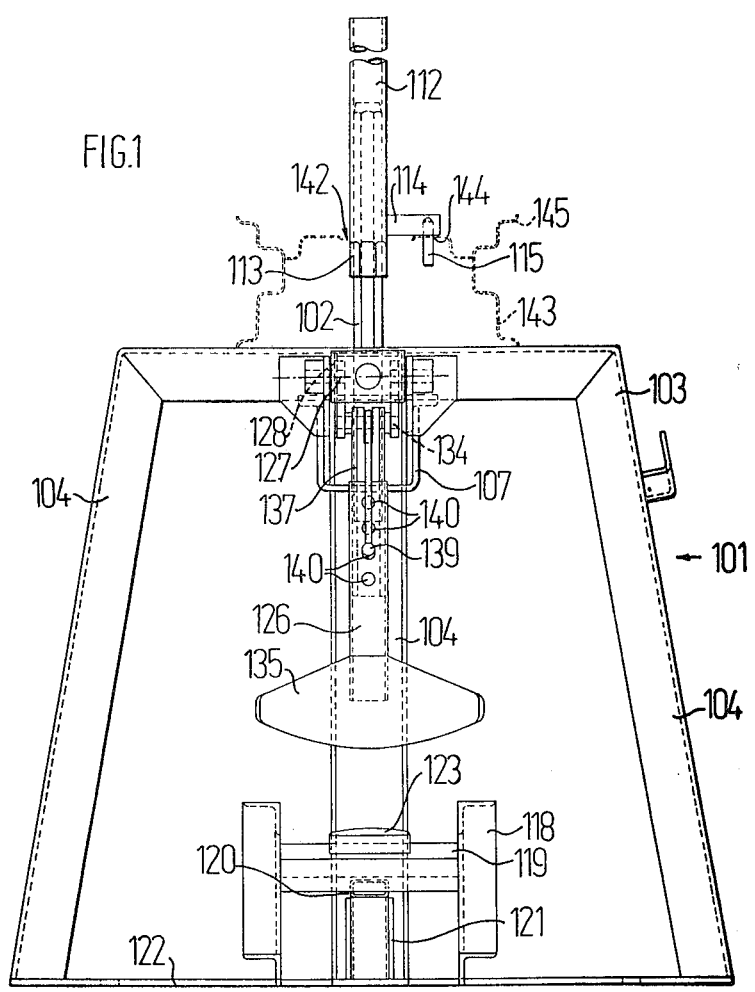

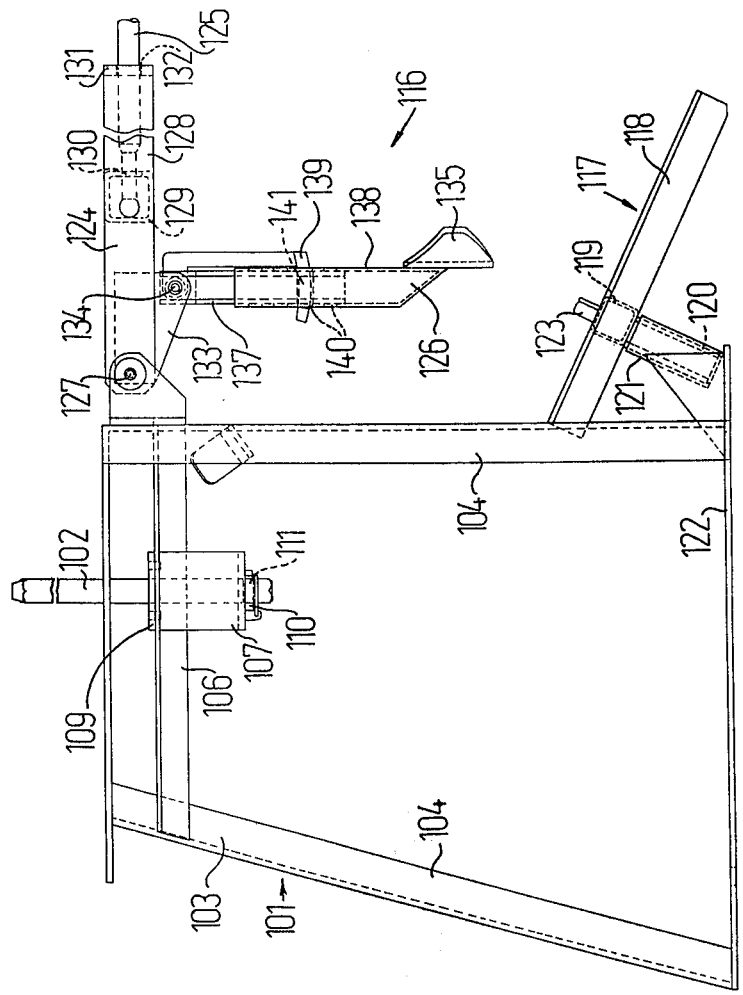

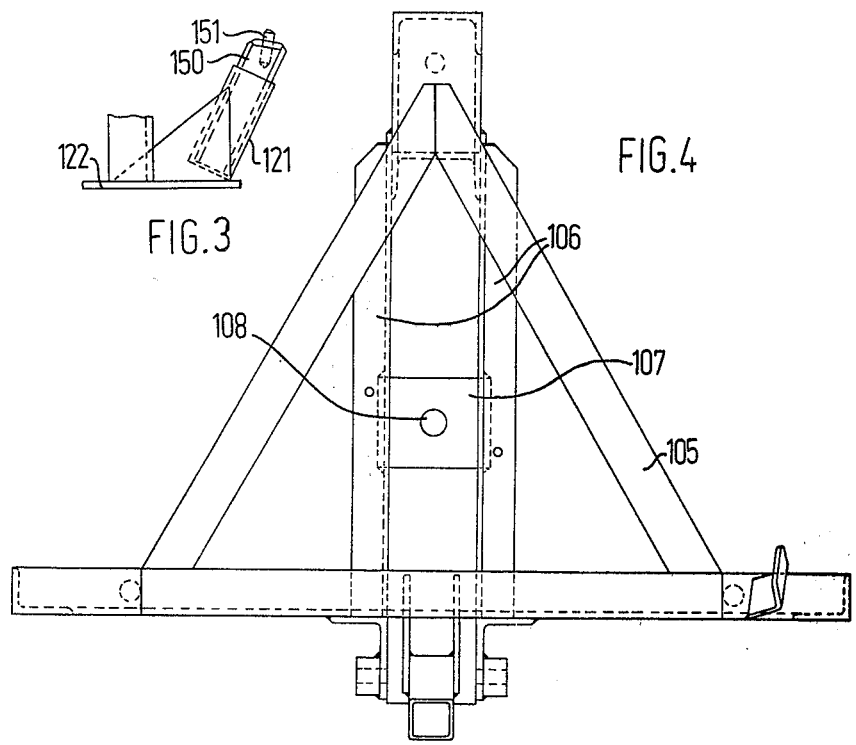

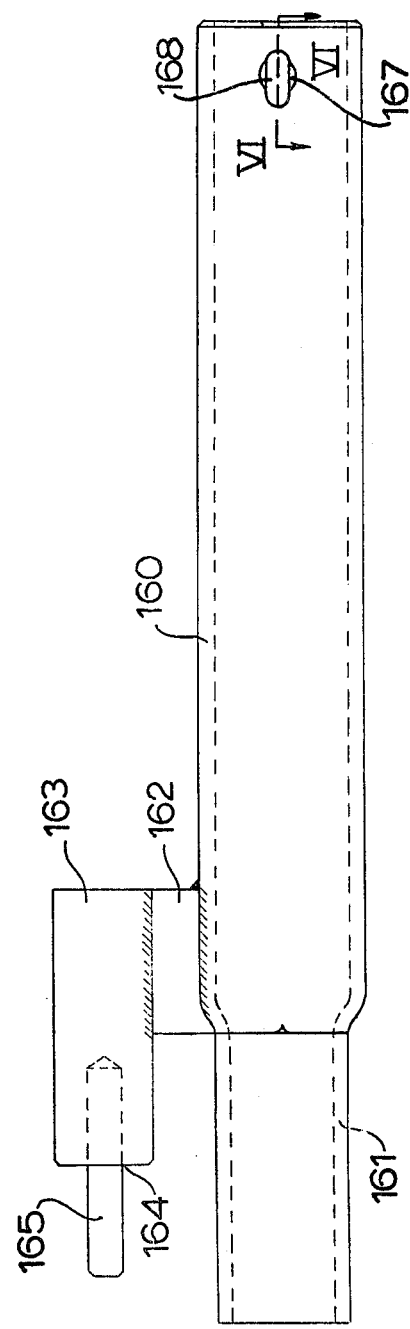

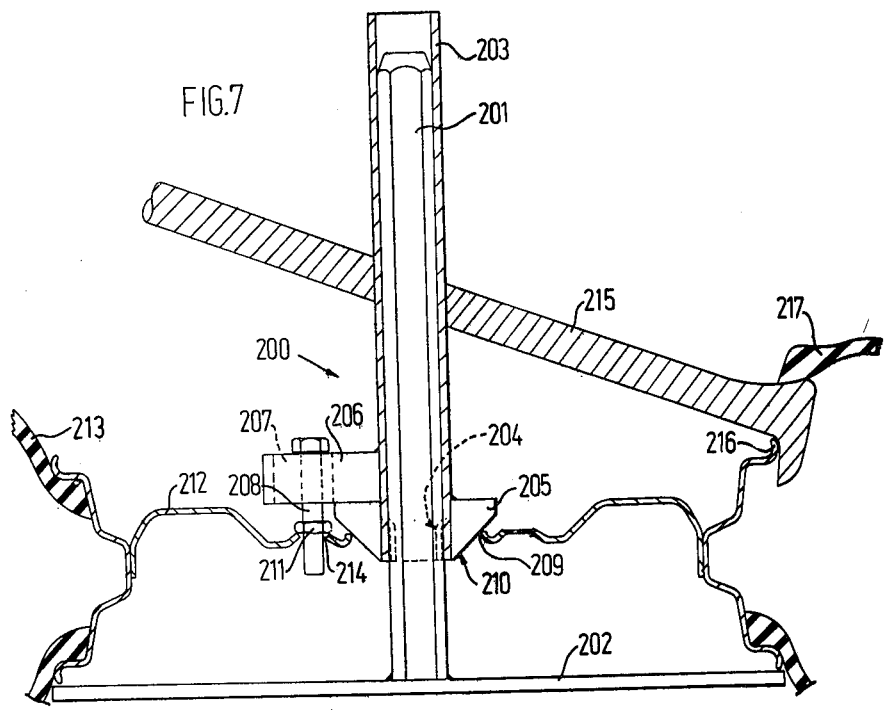

CLAMPING DEVICE

This invention relates to a clamping device particularly for preventing rotation of a workpiece while an operation is being carried out on it. In particular it relates to a device for clamping a wheel in a required position during a tire changing operation.

In accordance with the invention a clamping device for a workpiece having a hole extending therethrough comprises a base, a post of non-circular cross-section non-rotatably secured to the base and extending outwardly therefrom, the workpiece being capable of being supported against the base with the post extending through the hole of the workpiece, a securing member having an internal cross-sectional shape corresponding sufficiently to the non-circular cross-section of the post to enable the securing member to be non-rotatably positioned on the post, the securing member having a projection extending outwardly therefrom for abutment with an edge of the workpiece inwardly of the workpiece periphery and extending radially from the post whereby on application of a force tending to rotate the workpiece about the post the abutment of the projection with the edge and the non-rotational engagement of the securing member with the post prevents rotation of the workpiece.

In accordance with a more limited aspect of the invention a clamping device comprises a base on which a workpiece having a hole extending therethrough may be supported in a substantially horizontal plane, an upright post of non-circular cross-section non-rotatably secured to the base and extending upwardly therefrom, the workpiece being capable of being positioned with the post extending through the hole of the workpiece, a securing member comprising an external surface for engagement with the edge of the hole and having an internal cross-sectional shape corresponding to the non-circular cross-section of the post to enable the securing member to be non-rotatably positioned on the post with the surface in engagement with the edge of the hole of the workpiece, the securing member having a projection extending outwardly therefrom for secure engagement with a radially extending edge of the workpiece radially inwards of the workpiece periphery whereby on application of a force tending to rotate the workpiece about the post the abutment of the projection with the edge and the non-rotational engagement of the securing member with the post prevents rotation of the workpiece.

When the device is used for clamping a wheel the hole through which the post protrudes is the central hole of the wheel and the radially extending edge is an edge of a bolt hole provided radially outwards of the central hole. The projection may include a peg capable of being positioned in the bolt hole to engage the edge thereof.

The invention will be better understood from the following description of the three embodiments of the invention, all devices for clamping a wheel, by way of example only, with reference to the accompanying drawings of which:

FIG. 1 shows a front elevation of a first embodiment of the device in accordance with the invention with a wheel (shown in dotted lines in cross-section) in position for a tire to be fitted thereto;

FIG. 2 shows a side elevation of the device shown in FIG. 1;

FIG. 3 shows a side elevation of an alternative arrangement of part of the device shown in FIG. 2;

FIG. 4 shows a plan view of the top portion of the device shown in FIGS. 1 and 2 but with certain parts omitted for clarity;

FIG. 5 shows an alternative form of securing member which is part of the device shown in FIG. 1;

FIG. 7 shows a cross-section through a device in accordance with the second embodiment of the invention in use during a tire changing operation;

Figure 6:
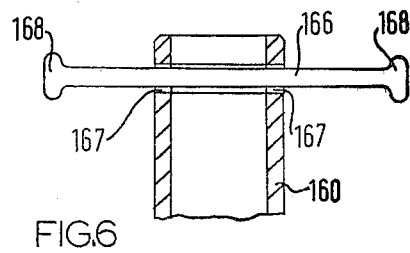
FIG. 6 shows a fragmentary cross-section on lines 6—6 of FIG. 5.

The device of the first embodiment 101 comprises a tire changing apparatus and comprises a vertical post 102 of hexagonal cross-section secured to a stand 103 comprising several pieces of angle iron welded together. The stand comprises three legs 104 and has a triangular top frame 105 as can be seen in FIG. 4. Immediately beneath the top frame are welded two parallel spaced-apart members 106 of L-shaped cross-sectional form and these members are welded to a U-shaped piece of metal 107 having a hole 108 formed at its lowest point. The post is welded to a small rectangular plate 109 so as to have a portion of its length on each side of the plate. This plate is secured by means of bolts to the top faces of the two L-shaped members 106 of the stand 103. The lowest portion of the post 102 protrudes through the hole 108 in the U-shaped piece of metal and is maintained in position by a detachable peg 110 which fits into a hole 111 at the lower extremity of the post.

The device further comprises a securing member 112 in the form of an elongated cylindrical tube formed at one end 113 into the form of a box wrench having a hexagonal internal cross-sectional configuration corresponding to the external shape of the post. The tube may be slidably positioned on the post but cannot be rotated in relation thereto.

Adjacent one end of the tube a short rectangular section bar 114 is welded to the outer surface thereof. Towards the end of this bar remote from the tube there is provided a peg 115 aligned substantially parallel to the axis of the tube.

The stand also comprises a mechanism 116 (see FIG. 2) whereby the seal between the bead of a tire mounted on a wheel rim can be broken even in some instances when the tire is in a fully inflated condition. The mechanism comprises a sloping platform 117 formed of two side pieces 118 of angle iron and a cross-piece 119 of square section tubing welded together. Welded to the lower side of the cross-piece is a short square section bar 120 which seats within a further short square section tube 121 welded to the base of the stand 122 so as to locate the platform. The upper surface of the platform is provided with a projection 123 of crescent-shaped form when viewed in plan against which a wheel rim can be located, the curved shape of the projection corresponding substantially to the radially inner surface of the wheel rim flange.

If the wheel is of the type which has a hole immediately radially inwards of the rim, the platform may be replaced by the arrangement shown in FIG. 3, which comprises a short square section bar 150, having at one end a short peg 151. The bar fits inside the square section tube 121 so that the peg projects upwardly in a near-vertical direction. In use, the hole near the rim in a wheel is located on the peg so that the wheel is tilted at a small angle to the horizontal.

The bead breaking mechanism further comprises a socket member 124 for receiving a lever 125 e.g. a tire fitting and removal lever and a spade member 126 of adjustable length for engaging the tire sidewall immediately radially outwards of the tire bead and the wheel rim flange.

The socket member is mounted at one end to rotate about a horizontal axis on a pivot 127 on the stand and comprises two spaced-apart side members 128 between which are welded a piece of square section tubing 129 having a hole 130 therein for receiving the extremity of the lever 125 (as shown in dotted outline in FIG. 2) and a plate 131 also having a hole 132 therein also for receiving the lever.

Two triangular brackets 133 each welded to one of the side members carries a pivot 134 for the spade member which comprises a curved plate 135 at the end of a shank 126 pivotally mounted at its end remote from the plate on the brackets 133. The shaft comprises two lengths 137 and 138 of square cross-section one piece 137 telescoping inside the other piece 138 to enable the shank length to be adjusted for different tire and wheel sizes. A peg member 139 is pivotally mounted on the pivot on the brackets to locate in one of a plurality of spaced-apart holes 140 in the outer piece 138 of shank tubing and a single hole 141 in the inner piece 137 of shank tubing to maintain the required shank length.

In use of this device to change a tire on a rim the wheel is first located on the platform 117 with the projection 123 radially inwards of the rim. The shank length of the spade member 126 is adjusted so that the lower extremity of the tip engages the tire sidewall immediately radially outwards of the wheel rim flange when the socket member 124 is in a substantially vertical position. A tire lever 125 is inserted in the socket member and by pulling on this lever an operator can apply downwards pressure via the spade member 126 to the tire to break the seal between the bead and the rim and move the bead axially inwards from its seat. Since the horizontal distance between the pivot 134 between the spade member 126 and the socket member 124 and the pivot 127 between the socket member 124 and the stand 103 is shorter when the socket member is in a vertical position than in a horizontal position considerable mechanical advantage is obtained and considerable pressure can be applied to the tire. This operation can be repeated several times around the circumference of the wheel rim to completely free the bead from its seat and then the wheel is turned over and the operation repeated for the other tire bead.

The wheel 143 with the tire (not shown) attached loosely to the rim is then positioned on the upper surface of the stand with the post 102 protruding through the central hole 142 of the wheel 143. The tube 112 is then slidably positioned on the post 102 with the lower edge of the bar 114 engaging the wheel. The peg 115 is positioned in a bolt hole 144 of the wheel or against another radially-extending edge of the wheel. The wheel 143 is now unable to rotate when a tire lever (not shown in FIG. 1) is inserted between the wheel rim 145 and the tire bead and levered against the tube 112 by the operator walking around the stand. Any tendency of the wheel to rotate is prevented by the peg 115 attached to the tube 112 which is itself preevented from rotation about the post 102 by its non-circular shape. The tube protects the post during the tire changing operation during which torque is placed on the wheel and this torque is transmitted through the peg to the tubular member and to the post. The load between the tube and the post is such that it prevents the tube sliding up the post. The wheel is therefore firmly located all the time the torque is applied to it. The wheel does not have to be positioned with the post accurately at its center and so long as the peg is positioned in the bolt hole the clamping effect will be obtained. The device is thus suitable for a range of wheel center hole sizes and bolt hole pitch center diameters.

An alternative form of securing member for use with the device of the first embodiment is shown in FIGS. 5 and 6. The member comprises a tube 160 which is cylindrical over the major part of its length but a portion 161 adjacent one end is of hexagonal cross-section, having the form of a box-wrench. The portion of the tube of hexagonal cross-section is longer than the corresponding part of the tube 112 shown in FIG. 1.

Welded to the cylindrical part of the tube, adjacent the junction between the cylindrical and hexagonal parts is a rectangular bar 162 welded to which is a solid cylindrical rod 163. The rod is provided with a hole 164 on its axis into which is forced a high strength steel roll-pin to form a short peg 165. The axis of the peg is parallel to but spaced-apart from the axis of the tube 160.

The increased length of the hexagonal portion of the tube and the different peg arrangement enables wheels having bolt holes which are axially off-set by a considerable amount from the edge of the central wheel hole to be clamped, such wheels not being securable by the securing member of the first embodiment.

The alternative form of securing member is also provided with a short slideable handle or tommy-bar 166 positioned adjacent the end further from the hexagonal portion. The tommy-bar extends at right angles to the tube axis and is slidable in two holes 167 in the tube. The ends 168 of the tommy-bar are flattened and widened so as to prevent its separation from the tube 160.

The provision of a tommy-bar for the securing member enables an operator to put a torque on the member by pressing on the tommy-bar and hence clamp the wheel when required, for example during removal of an inner tube from within a tire or during the initial positioning of the tire lever between the wheel rim flange and the tire bead. It will be appreciated that when no torque is applied to the securing member the wheel can easily be moved small amounts on the top surface of the stand so means for clamping a wheel when performing operations such as exemplified above is desirable. The small torque obtainable by pressing on the tommy-bar is sufficient to clamp the wheel during such operations.

Figure 8:
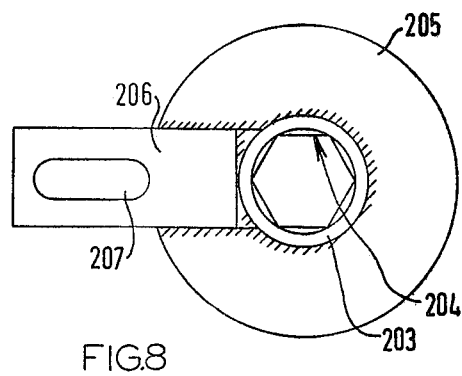
FIG. 8 shows a plan view of part of the device, the securing member, shown in FIG. 7.

The device 200 of the second embodiment illustrated in FIGS. 7 and 8 comprises a vertical post 201 of hexagonal cross-section welded to a base plate 202. This base plate may be a continuous lamina or of open structure e.g. several elongated members such as pieces of square section tubing welded together. The post 201 is securely welded to the base plate 202 which itself is mounted on a stand (not shown in FIG. 7 but may be as shown in FIG. 1) the base plate being at any convenient working height.

The device further comprises a securing member in the the form of an elongated cylindrical tube 203 formed at one end 204 into the form of a box wrench having a hexagonal internal cross-sectional configuration corresponding to the external shape of the post. The tube may be slidably positioned on the post but cannot be rotated in relation thereto. Externally of that end of the member formed into a box wrench shape there is welded a cone 205 having a cone angle of 45°. The size of the cone is such that its maximum diameter is greater than the central hole formed in the majority of standard size wheels and the conical surface thereof may engage against the edge of this central hole. The conical shape enables a variety of wheels having different size central holes to be engaged securely by the conical surface.

Adjacent the cone a short rectangular section bar 206 is welded to both the cone 205 and the outer surface of the tube 203. Towards the end of this bar remote from the tube there is provided an elongated slot 207 enabling a peg 208 to be positioned in the slot substantially parallel to the axis of the tube. This peg can conveniently be a bolt having a nut 211 welded to its shank. The peg is therefore a loose fit in the slot but cannot be removed from it.

In use of the device a wheel 212 having a tire 213 to be changed is positioned on the base plate with the hexagonal post 201 protruding through the central hole 209 of the wheel. The tube 203 is then slidably positioned on the central post 201 with the conical surface 210 of the cone 205 engaging the edge of the central hole 209 in the wheel. The peg 208 is then positioned in a bolt hole 214 of the wheel or against another radially extending edge of the wheel. The wheel is now unable to rotate during the tire changing operation when a tire lever 215 is inserted between the wheel rim 216 and the tire bead 217 and levered against the tube 203 the operator walking around the tire. Any tendency of the wheel to rotate is prevented by the peg attached to the tube which itself prevented from rotation about the post by its non-circular shape. The tube protects the post during the tire changing operation during which torque is placed on the wheel and this torque is transmitted through the peg to the tubular member and to the post. The load between the tube and the post is such that it prevents the tube sliding up the post. The wheel is therefore firmly located all the time the torque is applied to it.

The cone at the end of the tube can be made suitable for a range of wheel center holes and the tube easily positioned vertically to be suitable for the differing positions of wheel naves of different wheel designs.

As an alternative to the hexagonal shape at the end of the post and the corresponding internal shape of the end of the tube a circular post with a keyway for a tube having a circular cross-section and radially inwardly extending key would fill the same function.

Figure 10:
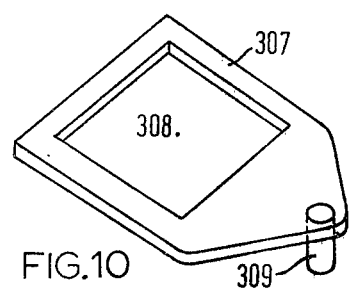
FIG. 10 shows a perspective view of part of the device of the third embodiment, the securing member, shown in FIG. 9.
Figure 9:
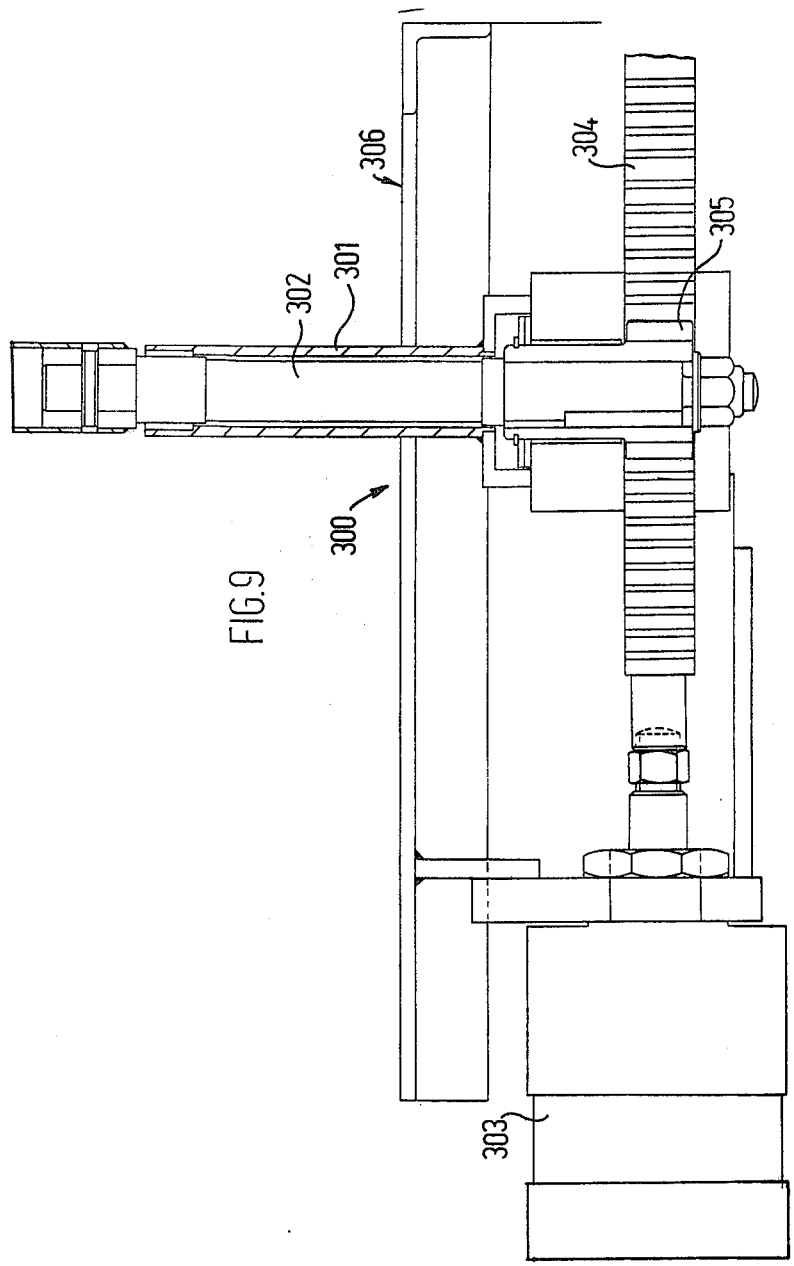
FIG. 9 shows a cross-section through a third embodiment of the device.

The device 300 of the third embodiment illustrated in FIGS. 9 and 10 is similar to that of the first embodiment except that the vertical post 301 is hollow. A spindle 302 inside the post is rotatably driven by means of a piston and cylinder assembly 303 acting through a rack 304 and pinion 305 positioned beneath the working surface 306 of the stand to a tire removal lever (not shown) connected to the spindle which protrudes from the top of the hollow post. The spindle may alternatively be driven by a motor. The securing member 307 comprises a flat plate as shown in detail in FIG. 10 provided with a square hole 308 the distance opposite sides of which is slightly larger than the distance between opposite flat faces of the hexagonal post 301. The plate is therefore a sliding fit on the post but is non-rotatable relative thereto. The plate also carries a short peg 309 which is capable of engaging in a bolt of the wheel.

To use the device as shown in FIGS. 9 and 10 the wheel and tire assembly is placed on the top surface of the stand with the hollow post protruding through the central hole of the wheel. The plate 307 is slid down the spindle 302 and hollow post 301 so that two sides of the square hole 308 engage with the hexagonal outer surface of the post and the peg engages with a bolt hole in the wheel. The tire removal (or fitting) lever (not shown), is then fitted to the top of the spindle so as to engage with the wheel rim and tire so that on rotation of the spindle the tire is removed (or fitted) to the wheel. During this operation a force is applied via the lever tending to rotate the wheel but this is prevented by the abutment of the peg with the edge of a bolt hole and the plate with the hollow post thereby clamping the wheel.

While hexagonal cross-sectional posts have been described in all three embodiments it will be understood that there are many other cross-sectional shapes which can be utilized e.g. square, in order to fulfil the same function. Additionally there are many other possible internal cross-sectional shapes for the securing member, corresponding sufficiently or wholly to the shape of the post.

I claim:

1. A clamping device for a workpiece having a hole extending therethrough comprising a base, a post of non-circular cross-section non-rotatably secured to the base and extending outwardly therefrom, the workpiece being capable of being supported against the base with the post extending through the hole of the workpiece, a securing member having an internal cross-sectional shape corresonding sufficiently to the non-circular cross-section of the post to enable the securing member to be non-rotatably positioned on the post, the securing member having a projection extending outwardly therefrom for abutment with an edge of the workpiece inwardly of the workpiece periphery and extending radially from the post, said internal cross-section and post having friction engaging surfaces therebetween whereby on application of a force tending to rotate the workpiece about the post the abutment of the projection with the edge and the non-rotational engagement of the securing member with the post prevents rotation and axial movement of the workpiece away from the base along the post without any separate locking means between the securing member and the post.

2. A clamping device according to claim 1 wherein the base is horizontal and the post extends upwardly from the base.

3. A clamping device according to claim 1 wherein the securing member comprises an internal surface which corresponds to the external surface of the post.

4. A clamping device according to claim 1 wherein the securing member comprises a flat plate.

5. A clamping device according to claim 4 wherein the flat plate is formed with a square hole and the post is formed with at least two flat faces which are parallel to one another and spaced-apart by a distance which is slightly less than that between opposite sides of the square hole.

6. A clamping device according to claim 1 wherein the securing member comprises a tube.

7. A clamping device according to claim 6 wherein part of the internal surface of the tube is hexagonal in cross-section and the external surface of the post is hexagonal in cross-section, the tube being a sliding fit on the post.

8. A clamping device according to claim 6 wherein the tube is provided with a slideable bar extending radially thereof.

9. A clamping device comprising a base on which a workpiece having a hole extending therethrough may be supported in a substantially horizontal plane, an upright post of non-circular cross-section non-rotatably secured to the base and extending upwardly therefrom, the workpiece being capable of being positioned with the post extending through the hole of the workpiece, a securing member comprising an external surface for engagement with the edge of the hole and having an internal cross-sectional shape corresponding to the non-circular cross-section of the post to enable the securing member to be non-rotatably positioned on the post with the surface in engagement with the edge of the hole of the workpiece, the securing member having a projection extending outwardly therefrom for secure engagement with a radially extending edge of the workpiece radially inwards of the workpiece periphery, said internal cross-section and post having friction engaging surfaces therebetween whereby on application of a force tending to rotate the workpiece about the post the abutment of the projection with the edge and the non-rotational engagement of the securing member with the post prevents rotation and axial movement of the workpiece away from the base along the post without any separate locking means between the securing member and the post.

10. A clamping device according to claim 9 wherein the surface for engaging the edge of the hole in the workpiece is conical.

11. A tire changing apparatus including a clamping device according to claim 1.

* * * * *